US012417525B2

(12) United States Patent
Shukla et al.

(10) Patent No.: US 12,417,525 B2
(45) Date of Patent: Sep. 16, 2025

(54) DEVICE FAILURE ANALYSIS UTILIZING AGGREGATED VIEWS OF MULTIPLE IMAGES OF DEVICES

(71) Applicant: Dell Products L.P., Round Rock, TX (US)

(72) Inventors: Ravi Shukla, Bengaluru (IN); An Chung, Pflugerville, TX (US); Jimmy Henry Wiggers, Cedar Park, TX (US); Sudipta Pradhan, Kharagpur (IN)

(73) Assignee: Dell Products L.P., Round Rock, TX (US)

( * ) Notice: Subject to any disclaimer, the term of this patent is extended or adjusted under 35 U.S.C. 154(b) by 463 days.

(21) Appl. No.: 17/554,484

(22) Filed: Dec. 17, 2021

(65) Prior Publication Data
US 2023/0196540 A1  Jun. 22, 2023

(51) Int. Cl.
*G06K 9/00* (2022.01)
*G06T 7/00* (2017.01)
*G06T 7/11* (2017.01)
*G06V 10/44* (2022.01)
*G06V 10/764* (2022.01)

(52) U.S. Cl.
CPC ............. *G06T 7/0004* (2013.01); *G06T 7/11* (2017.01); *G06V 10/44* (2022.01); *G06V 10/764* (2022.01)

(58) Field of Classification Search
CPC ......... G06T 7/11; G06T 7/0004; G06V 10/44; G06V 10/764; G06V 2201/02
See application file for complete search history.

(56) References Cited

U.S. PATENT DOCUMENTS

2017/0046788 A1*  2/2017  Macciola ............. H04N 1/3872
2019/0362481 A1* 11/2019  Moertelmaier ........... G06T 5/20
2022/0405909 A1* 12/2022  Wang ................... G06V 10/771

FOREIGN PATENT DOCUMENTS

CN          111612763 A  *  9/2020  ......... G01N 21/8851

OTHER PUBLICATIONS

Law, Hei, and Jia Deng. "Cornernet: Detecting objects as paired keypoints." Proceedings of the European conference on computer vision (ECCV). 2018. (Year: 2018).*

(Continued)

*Primary Examiner* — Molly Wilburn
*Assistant Examiner* — Aidan Keup
(74) *Attorney, Agent, or Firm* — Ryan, Mason & Lewis, LLP

(57) ABSTRACT

An apparatus comprises a processing device configured to obtain a plurality of images each comprising at least a given portion of an instance of a computing device and to detect, utilizing an image classification machine learning model, at least a subset of the plurality of images having one or more designated failure characteristics. The processing device is also configured to create, utilizing a semantic segmentation machine learning model, a mask for each image in the subset of the plurality of images, the created masks characterizing locations of the designated failure characteristics in each image in the subset of the plurality of images. The processing device is further configured to generate an aggregated view of locations of the designated failure characteristics for the subset of the plurality of images utilizing the created masks, and to perform failure analysis for the computing device utilizing the generated aggregated view.

20 Claims, 17 Drawing Sheets

(56) References Cited

OTHER PUBLICATIONS

J. Redmon et al., "You Only Look Once: Unified, Real-Time Object Detection," arXiv:1506.02640v5, May 9, 2016, 10 pages.
Open Source Computer Vision, "Geometric Image Transformations," https://docs.opencv.org/3.4/da/d54/group_imgproc_transform.html, Accessed Aug. 20, 2021, 22 pages.
J. Korstanje, "Yolo v5 Object Detection Tutorial," https://towardsdatascience.com/yolo-v5-object-detection-tutorial-2e607b9013ef, Sep. 28, 2020, 8 pages.
M. Thoma, "A Survey of Semantic Segmentation," arXiv:1602.06541v2, May 11, 2016, 16 pages.
Numpy, "The Fundamental Package for Scientific Computing with Python," https://numpy.org/, Accessed Dec. 17, 2021, 4 pages.
U.S. Appl. No. 17/462,235 filed in the name of An Chung et al. on Aug. 31, 2021, and entitled "Service Request Processing Utilizing Modified Versions of Images of Computing Devices.".

\* cited by examiner

FIG. 9

Sample Collection for Target Part Number Across Multiple Locations — 901

Sample A at Location 1 | Sample B at Location 1 | Sample C at Location 2 | Sample D at Location 3

Operator Binary Evaluation — 903

| | T1 | T2 | T3 | M1 | M2 | M3 | B1 | B2 | B3 |
|---|---|---|---|---|---|---|---|---|---|
| Sample A | 0 | 1 | 1 | 0 | 1 | 1 | 0 | 0 | 1 |
| Sample B | 0 | 0 | 0 | 0 | 0 | 0 | 0 | 0 | 1 |
| Sample C | 1 | 0 | 0 | 1 | 0 | 0 | 0 | 1 | 0 |
| Sample D | 0 | 0 | 0 | 0 | 0 | 0 | 0 | 0 | 0 |

905

| | T1 | T2 | T3 | M1 | M2 | M3 | B1 | B2 | B3 |
|---|---|---|---|---|---|---|---|---|---|
| Sample A | 0 | 1 | 1 | 0 | 0 | 1 | 0 | 0 | 1 |
| Sample B | 0 | 0 | 0 | 0 | 0 | 0 | 0 | 0 | 1 |
| Sample C | 1 | 0 | 0 | 1 | 0 | 0 | 0 | 0 | 0 |
| Sample D | 0 | 1 | 1 | 1 | 0 | 1 | 0 | 0 | 0 |
| Total | 1 | 1 | 2 | 2 | 0 | 2 | 0 | 0 | 2 |

DEVICE FAILURE ANALYSIS UTILIZING AGGREGATED VIEWS OF MULTIPLE IMAGES OF DEVICES

FIELD

The field relates generally to information processing, and more particularly to device management in information processing systems.

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices.

SUMMARY

Illustrative embodiments of the present disclosure provide techniques for performing device failure analysis utilizing aggregated views of multiple images of devices.

In one embodiment, an apparatus comprises at least one processing device comprising a processor coupled to a memory. The at least one processing device is configured to perform the steps of obtaining a plurality of images, each of the plurality of images comprising at least a given portion of an instance of a computing device, and detecting, utilizing an image classification machine learning model, at least a subset of the plurality of images having one or more designated failure characteristics. The at least one processing device is also configured to perform the step of creating, utilizing a semantic segmentation machine learning model, a mask for each image in the subset of the plurality of images, the created masks characterizing locations of the one or more designated failure characteristics in each image in the subset of the plurality of images. The at least one processing device is further configured to perform the steps of generating an aggregated view of locations of the one or more designated failure characteristics for the subset of the plurality of images utilizing the created masks, and performing failure analysis for the computing device utilizing the generated aggregated view.

These and other illustrative embodiments include, without limitation, methods, apparatus, networks, systems and processor-readable storage media.

BRIEF DESCRIPTION OF THE DRAWINGS

FIG. 9 shows aggregation of operator binary evaluation of input images sampled from multiple locations in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
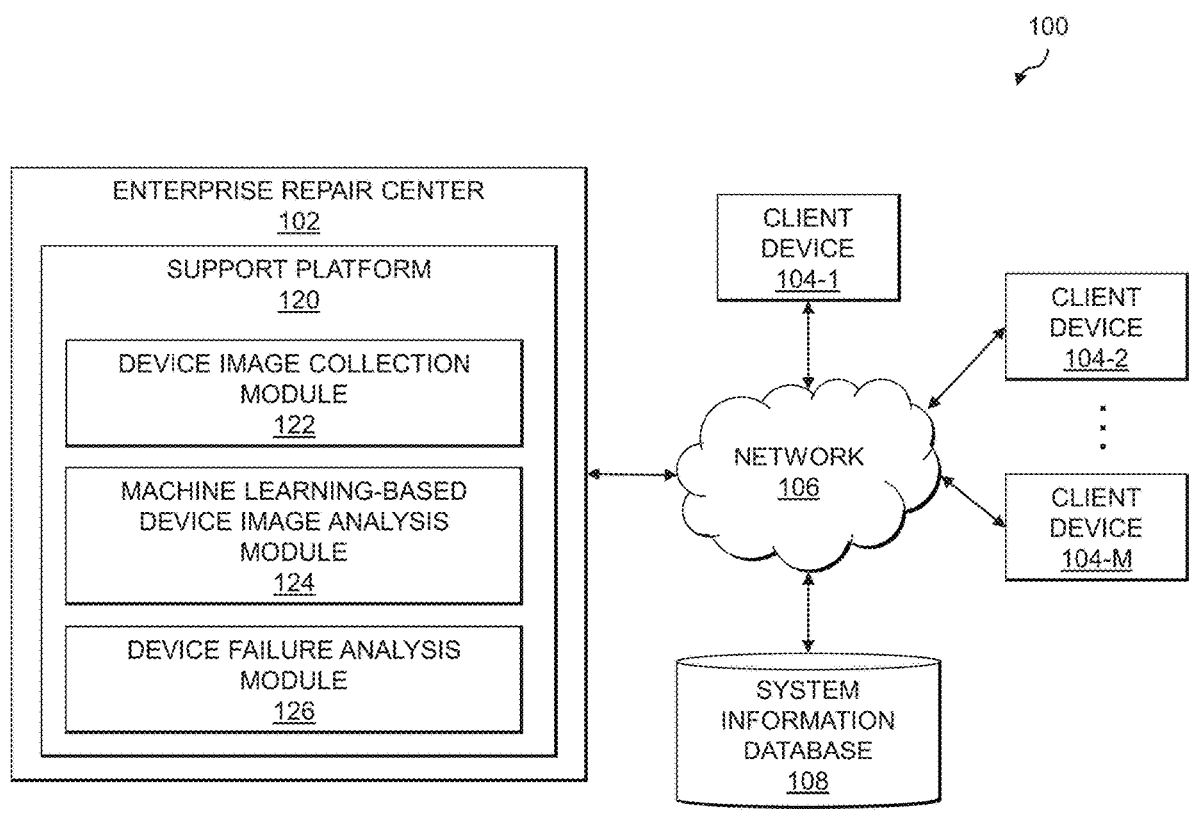
FIG. 1 is a block diagram of an information processing system configured for performing device failure analysis utilizing aggregated views of multiple images of devices in an illustrative embodiment.

FIG. 1 shows an information processing system 100 configured in accordance with an illustrative embodiment. The information processing system 100 is assumed to be built on at least one processing platform and provides functionality for performing device failure analysis utilizing aggregated views of multiple images of devices. The information processing system 100 includes an enterprise repair center 102 and a plurality of client devices 104-1, 104-2, . . . 104-M (collectively, client devices 104) that are coupled to a network 106. Also coupled to the network 106 is a system information database 108, which may store various information relating to the client devices 104 (e.g., device images thereof).

The enterprise repair center 102 in the FIG. 1 embodiment includes a support platform 120, which is assumed to provide support services for the client devices 104. The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as virtual machines (VMs), containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art. In some embodiments, the client devices 104 comprise assets of an information technology (IT) infrastructure operated by an enterprise, and the enterprise repair center 102 is configured to provide support services for such assets using the support platform 120.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

As noted above, in some embodiments the support platform 120 of the enterprise repair center 102 is used for providing support services for an enterprise system (e.g., an IT infrastructure comprising the client devices 104). For example, an enterprise may subscribe to or otherwise utilize the support platform 120 to manage a set of assets (e.g., the client devices 104) operated by users of the enterprise. As used herein, the term "enterprise system" is intended to be construed broadly to include any group of systems or other computing devices. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The system information database 108, as discussed above, is configured to store and record information relating to the client devices 104 or other assets that are managed using the support platform 120. Such information illustratively includes device images, system state information, logs of repairs and troubleshooting actions, details of warranties or other support services, training data for machine learning models used to analyze device images, etc. The system information database 108 in some embodiments is implemented using one or more storage systems or devices associated with the support platform 120. In some embodiments, one or more of the storage systems utilized to implement the system information database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise repair center 102 and/or support platform 120, as well as to support communication between the enterprise repair center 102, the support platform 120 and other related systems and devices not explicitly shown.

The support platform 120 may be operated by a hardware vendor that manufactures and sells computing devices (e.g., desktops, laptops, tablets, smartphones, etc.), and the client devices 104 may represent computing devices sold by that hardware vendor. The support platform 120, however, is not required to be operated by a hardware vendor that manufactures and sells computing devices. Instead, the support platform 120 may be offered as a service to provide support for computing devices that are sold by any number of hardware vendors. The client devices 104 may subscribe to the support platform 120, so as to provide support including troubleshooting of hardware and software components of the client devices 104. Various other examples are possible.

In some embodiments, the client devices 104 may implement host agents that are configured for automated transmission of information in conjunction with service requests that are submitted to the support platform 120. Such information may include device images for a computing device to be serviced (e.g., one of the client devices 104). Such host agents may also be configured to automatically receive from the support platform 120 various support information (e.g., details of troubleshooting and repair actions performed on or for the client devices 104, support services that are available to the client devices 104, etc.). The host agents may comprise support software that is installed on the client devices 104.

It should be noted that a "host agent" as this term is generally used herein may comprise an automated entity, such as a software entity running on a processing device. Accordingly, a host agent need not be a human entity.

As shown in FIG. 1, the enterprise repair center 102 includes the support platform 120. The support platform 120, as will be described in further detail below, is configured to perform device failure analysis utilizing aggregated views of multiple images of devices. For example, the device images may be used to determine a type or cause of damage to a computing device or one or more components thereof, to diagnose and remediate issues encountered on computing devices, etc.

Although shown as an element of the enterprise repair center 102 in this embodiment, the support platform 120 in other embodiments can be implemented at least in part externally to the enterprise repair center 102, for example, as a stand-alone server, set of servers or other type of system coupled to the network 106. In some embodiments, the support platform 120 or components thereof may be implemented at least in part within one or more of the client devices 104.

The support platform 120 in the FIG. 1 embodiment is assumed to be implemented using at least one processing device. Each such processing device generally comprises at least one processor and an associated memory, and implements one or more functional modules for controlling certain features of the support platform 120. In the FIG. 1 embodiment, the support platform 120 includes a device image collection module 122, a machine learning-based device image analysis module 124, and a device failure analysis module 126.

The support platform 120 is configured to process servicing requests submitted by users of the client devices 104 for servicing of computing devices (which may be the client devices 104 themselves). Such servicing requests are assumed to include images of the computing devices to be serviced, where such images may include background noise, and may show the computing devices (or portions thereof) with various different object positioning, object orientation, and object capture angle. The device image collection module 122 is configured to obtain a plurality of images of computing devices, where each of the plurality of images comprises at least a given portion of an instance of a computing device. The device image collection module 122, in some embodiments, performs various preprocessing on the plurality of images. Such preprocessing is described in further detail elsewhere herein.

The machine learning-based device image analysis module 124 is configured to detect, utilizing an image classification machine learning model, at least a subset of the plurality of images having one or more designated failure characteristics. The machine learning-based device image analysis module 124 is also configured to create, utilizing a semantic segmentation machine learning model, a mask for each image in the subset of the plurality of images, the created masks characterizing locations of the one or more designated failure characteristics in each image in the subset of the plurality of images. The machine learning-based device image analysis module 124 is further configured to generate an aggregated view of locations of the one or more designated failure characteristics for the subset of the plurality of images utilizing the created masks. The device failure analysis module 126 is configured to perform failure analysis for the computing device utilizing the generated aggregated view.

It is to be appreciated that the particular arrangement of the enterprise repair center 102, client devices 104, support platform 120, device image collection module 122, machine learning-based device image analysis module 124, and device failure analysis module 126 illustrated in the FIG. 1 embodiment is presented by way of example only, and alternative arrangements can be used in other embodiments. As discussed above, for example, the support platform 120 or one or more components thereof may be implemented external to the enterprise repair center 102. As another example, the functionality associated with the device image collection module 122, the machine learning-based device image analysis module 124, and the device failure analysis module 126 may be combined into fewer modules, or separated across more modules with the multiple modules possibly being implemented with multiple distinct processors or processing devices. At least portions of the device image collection module 122, the machine learning-based device image analysis module 124, and the device failure analysis module 126 may be implemented at least in part in the form of software that is stored in memory and executed by a processor.

It is to be understood that the particular set of elements shown in FIG. 1 for performing device failure analysis utilizing aggregated views of multiple images of devices is presented by way of illustrative example only, and in other embodiments additional or alternative elements may be used. Thus, another embodiment may include additional or alternative systems, devices and other network entities, as well as different arrangements of modules and other components.

By way of example, in other embodiments, the support platform 120 may be implemented external to the enterprise repair center 102, such that the enterprise repair center 102 can be eliminated.

The support platform 120 and other portions of the system 100, as will be described in further detail below, may be part of cloud infrastructure.

The client devices 104, the support platform 120 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104 and the support platform 120, or components thereof, may be implemented on respective distinct processing platforms, although numerous other arrangements are possible. For example, in some embodiments at least portions of the support platform 120 and one or more of the client devices 104 are implemented on the same processing platform. A given client device (e.g., 104-1) can therefore be implemented at least in part within at least one processing platform that implements at least a portion of the support platform 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the enterprise repair center 102, the support platform and the client devices 104, the system information database 108, or portions or components thereof, to reside in different data centers. Numerous other distributed implementations are possible. The support platform 120 can also be implemented in a distributed manner across multiple data centers.

Additional examples of processing platforms utilized to implement the client devices 104, support platform 120 and other components of the system 100 in illustrative embodiments will be described in more detail below in conjunction with FIGS. 14 and 15.

It is to be appreciated that these and other features of illustrative embodiments are presented by way of example only, and should not be construed as limiting in any way.

An exemplary process for performing device failure analysis utilizing aggregated views of multiple images of devices will now be described in more detail with reference to the flow diagram of FIG. 2. It is to be understood that this particular process is only an example, and that additional or alternative processes for performing device failure analysis utilizing aggregated views of multiple images of devices may be used in other embodiments.

In this embodiment, the process includes steps 200 through 208. These steps are assumed to be performed by the support platform 120 utilizing the device image collection module 122, the machine learning-based device image analysis module 124, and the device failure analysis module 126. The process begins with step 200, obtaining a plurality of images, each of the plurality of images comprising at least a given portion of an instance of a computing device. The given portion of the computing device may comprise a screen of the computing device, a set of ports of the computing device, etc.

Step 200 may, in some embodiments, include preprocessing the plurality of images. Preprocessing a given one of the plurality of images may comprise detecting one or more designated types of objects in the given image, at least a given one of the one or more designated types of objects comprising at least the given portion of the computing device, identifying features of the given portion of the computing device in the given image, and performing an augmentation of the identified features of the given portion of the computing device to generate an augmented image. The identified features of the given portion of the computing device may comprise corners of the given portion of the computing device, and identifying the features of the given portion of the computing device in the given image may utilize a corners prediction machine learning model. The corners prediction machine learning model may utilize object detection to make predictions for each of a set of four corner classes and outputs predictions of locations of four corners of the given portion of the computing device, and performing the augmentation of the identified features of the given portion of the computing device to generate the augmented image may comprise performing a trapezoidal augmentation that stretches each of the four corners of the given portion of the computing device in the given image to a predefined image resolution.

In step 202, at least a subset of the plurality of images having one or more designated failure characteristics is detected utilizing an image classification machine learning model. A mask is created for each image in the subset of the plurality of images in step 204 utilizing a semantic segmentation machine learning model. The masks characterize locations of the one or more designated failure characteristics in each image in the subset of the plurality of images. An aggregated view of locations of the one or more designated failure characteristics for the subset of the plurality of images is generated in step 206 utilizing the created masks.

Step 206 may comprise performing mask binary digitization to generate arrays with entries corresponding to different locations in a field of view of the subset of the plurality of images, wherein each entry comprises a binary value indicating whether that location has the one or more designated failure characteristics, and performing binary aggregation of the generated arrays to determine a number of images in the subset of the plurality images having the one or more designated failure characteristics at each of the different locations in the field of view of the subset of the plurality of images. Performing the mask binary digitization may comprise, for a given one of the created masks: converting the given mask into a numerical representation; identifying a threshold numerical value of the numerical representation of the given mask; changing values in the numerical representation of the given mask less than or equal to the threshold numerical value to a first binary value indicating a location having the one or more designated failure characteristics; and changing values in the numerical representation of the given mask greater than the threshold numerical value to a second binary value indicating a location not having the one or more designated failure characteristics.

In some embodiments, step 206 comprises generating a visualization of the field of view of the subset of the plurality of images, wherein visual characteristics of different portions of the generated visualization indicate respective numbers of the images in the subset of the plurality of images having the one or more designated failure characteristics in the different locations in the field of the view of the subset of the plurality of images. The generated visualization may comprise a heat map. Generating the visualization may comprise, for each K*K pixel section in the binary aggregation of the arrays, identifying a maximum value and setting all pixel values in that K*K pixel section to the identified maximum value. K may be a factor of both a pixel height and a pixel width of the created masks.

Figure 2:
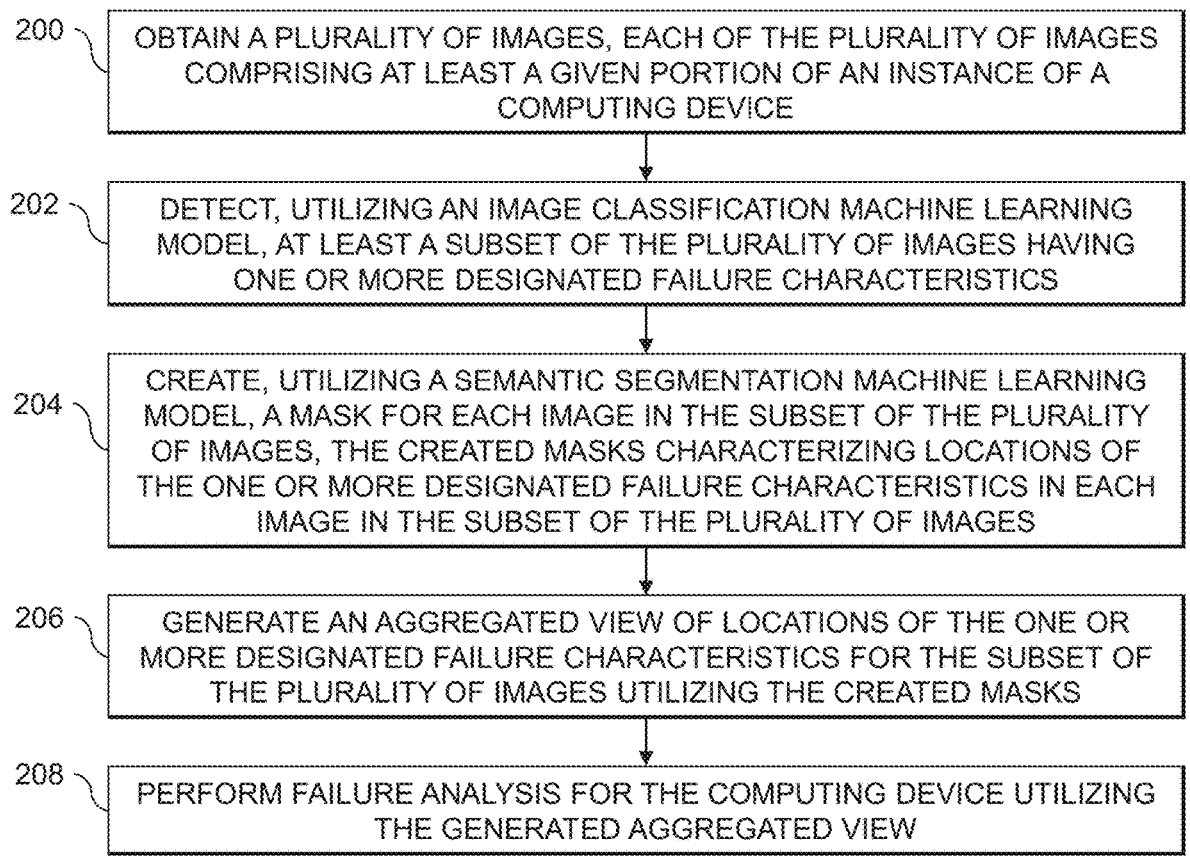
FIG. 2 is a flow diagram of an exemplary process for performing device failure analysis utilizing aggregated views of multiple images of devices in an illustrative embodiment.

The FIG. 2 process continues with step 208, performing failure analysis for the computing device utilizing the generated aggregated view. Step 208 may comprise determining differences in locations of the one or more designated failure characteristics for two or more different sets of instances of the computing device. The two or more different sets of instances of the computing device may utilize different part models in the given portion of the computing device.

Image collection and analysis may be used for various purposes, including by a support platform (e.g., support platform 120 of enterprise repair center 102) for use in obtaining qualitative information about device failures by leveraging computer vision technology to detect failure patterns. Computer vision technology is a field of artificial intelligence (AI) that trains computers to interpret and understand the visual world. Due to variations in image collection processes (e.g., across different sites of a repair center, across different repair centers, from different end-users and via different end-user facing social media channels, etc.), images are inconsistent in quality due to variables such as object positioning, object orientation, and object capture angle. Variability can also be introduced in the form of non-object related image features, such as background noise, and is generally detrimental to achieving high accuracy AI models used for qualitative assessment of specific objects or features.

Variability of image collection processes across global repair centers and different end users (e.g., including various types of end-user facing social media channels) can strongly impact consistency in image quality, including variables such as object positioning, object orientation, and object capture angle. Variability in object positioning refers to objects appearing in different locations within the field of view (FOV) in different images. Variability in object orientation refers to objects appearing in different orientations within the FOV in different images. Variability in object capture angle refers to images being captured with non-orthogonal angles to objects, causing distortion in object shape. Device images may also be captured with nonessential features, such as background noise, which is generally detrimental to achieving high accuracy AI models for qualitative assessment. Background noise may include extraneous objects (e.g., objects of no interest) that are part of an image. Variability in device image consistency reduces a computer vision algorithm's ability to qualitatively assess an object of focus.

Creating consistency in device image collection processes across global repair centers may be achieved with improvements to processes, through the purchase of high-quality cameras and lighting equipment, etc. Such process changes, however, can incur increased costs as additional processes are not conducive to repair center key performance indicators (KPIs) including cycle time and time to repair. For example, requiring that objects be moved, or adjusting object position, orientation and angle to some uniform standard prior to image capture can increase cycle time and time to repair, as well as require training of the individuals performing such adjustments. Similarly, upgrading camera and lighting equipment also incurs increased costs as high quality image capture stations add to the cost per image due to amortized capital expenditures.

Analysis of damage or defects detected across multiple devices (e.g., multiple device units having a same part number within a large population of similar parts) is useful for various tasks, including but not limited to increasing the efficiency of gaining insights into part-specific failure trends, diagnosing part failure, identifying repair or troubleshooting actions, etc. Identifying device or product failure trends is key to improving current and future generations of products. Illustrative embodiments provide techniques for processing images of similar products or devices to detect the location of product or device defects and to aggregate common defect locations within a particular product or device (e.g., a specific part number of a product or device) into a single viewable image or other visual representation using a sequence of deep learning models. Advantageously, such techniques enable quality engineers to quickly determine if there is commonality in failure type and location that should be further investigated.

Device image collection may be used as a strategic initiative by an enterprise to obtain qualitative information about device failures, with such qualitative information being utilizable for improving future generations of products. Product failure analysis (PFA) is a process within service repair to determine the root cause of visible product failures. Conventional PFA approaches are typically highly manual processes, which may be performed by isolating a sample set of failed product or device units in the field (often a low quantity), performing a human-level inspection, mapping individual failure regions in a discrete fashion to a low-resolution grid, and compiling the samples into a summarized view for a product-by-product comparison.

Figure 3:
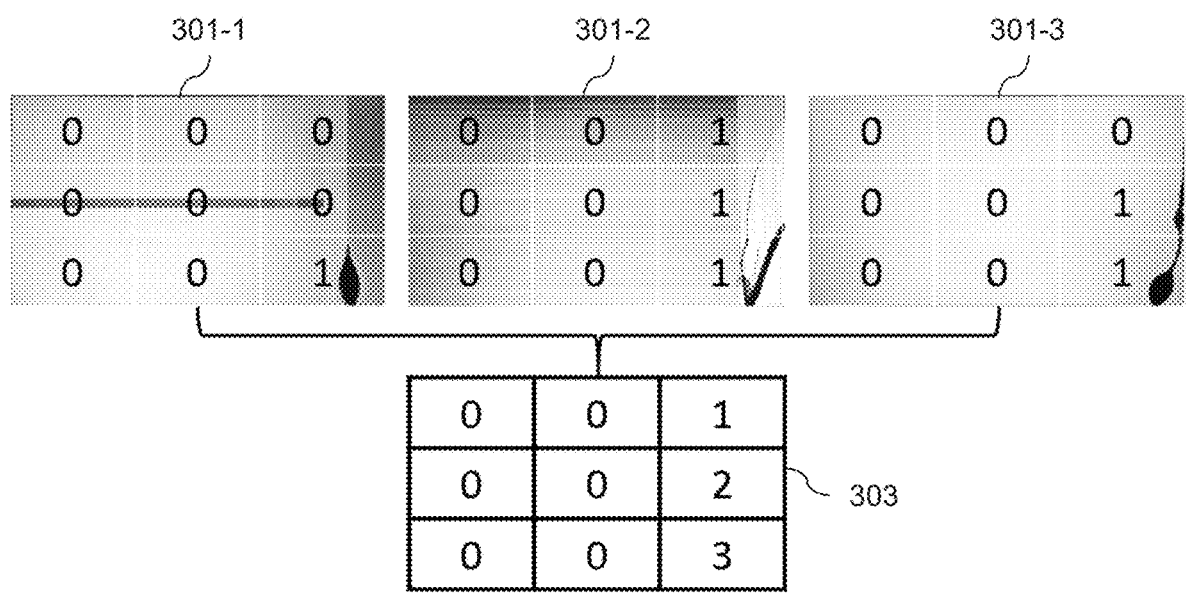
FIG. 3 shows analysis of defects in device screen images in an illustrative embodiment.

FIG. 3 illustrates such an approach, where a set of device screen images 301-1, 301-2 and 301-3 (collectively, device screen images 301) are manually analyzed with different sections thereof being marked with a "0" to indicate no failure in that portion of the device screen and a "1" to indicate failure in that portion of the device screen. In the FIG. 3 example, each of the device screen images 301 is broken down into nine sections—top left (T1), top center (T2), top right (T3), middle left (M1), middle center (M2), middle right (M3), bottom left (B1), bottom center (B2) and bottom right (B3). The device screen image 301-1, for example, indicates failure (e.g., cracked liquid crystal display (LCD) glass) only in the B3 region of the device screen, the device screen image 301-2 indicates failure in the T3, M3 and B3 regions of the device screen, and the device screen image 301-3 indicates failure in the M3 and B3 regions of the device screen. These are aggregated as shown in matrix 303, where the T3 region has one failure instance, the M3 region has two failure instances, and the B3 region has three failure instances.

Such manual approaches, however, suffer from various disadvantages and limitations. Manual approaches for PFA are widely inefficient, due to the difficulties in collecting physical failure samples from a global supply chain, in evaluating samples with consistency at high volume across multiple sites (e.g., different repair centers operated by a same enterprise), etc. Illustrative embodiments provide techniques which significantly improve PFA by using computer vision on images of physical device units to both digitize failure characteristics and compile digital mappings into a single aggregated view. For example, a three-layered or three-stage approach may be utilized including a preprocessing layer or stage, a defect pattern generation layer or stage, and an aggregation layer or stage.

Figure 4:
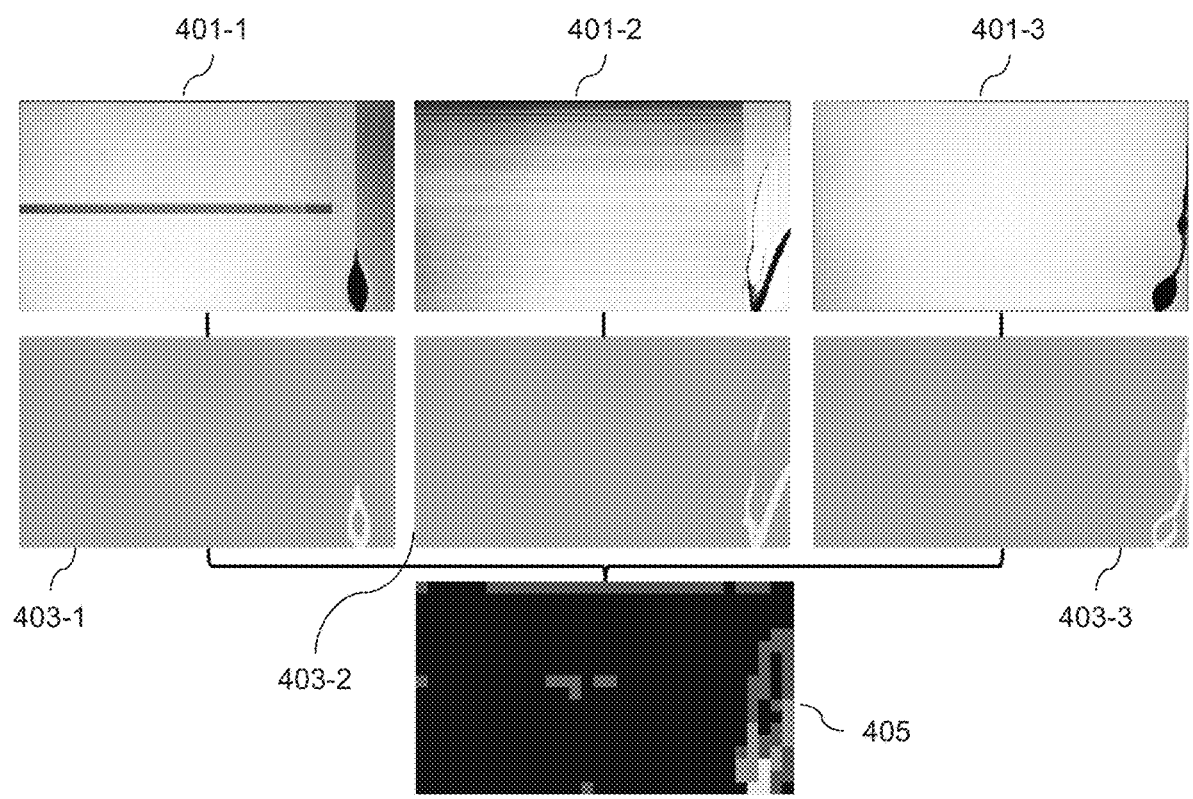
FIG. 4 shows a three-stage approach for preprocessing, defect identification, and generation of an aggregate view of defects across a set of input images in an illustrative embodiment.

FIG. 4 illustrates such a three-layer or three-stage approach for automating PFA. While FIG. 4 is described with respect to the context of analyzing failures and defects in device screens (e.g., LCD cracked glass). The first layer or stage is preprocessing, where device images are converted into standardized device screen images 401-1, 401-2 and 401-3 (collectively, standardized device screen images 401). As will be described in further detail elsewhere herein, the standardized device screen images 401 may be obtained through application of a deep learning approach that automatically pinpoints corners of an object (e.g., a rectangular shaped object), and utilizes an augmentation function (e.g., a trapezoidal augmentation function) to transform images to a standard shape (e.g., a standard rectangular shape). This solution enables near-infinite optionality on how images focused on specific objects can be captured, and works with any image regardless of background noise, object position, object orientation, and object capture angle.

The second layer or stage includes defect pattern generation, where each of the standardized device screen images 401 is converted to a defect pattern image 403-1, 403-2 and 403-3 (collectively, defect pattern images 403) highlighting regions of the standardized device screen images 401 where defects are detected.

The third layer or stage includes generation of an aggregate view image 405 of the defect pattern images 403. The aggregate view image 405 is illustratively in the form of a heat map, where the shading or colors used in the aggregate view image 405 correspond to the numbers of defect pattern images 403 which have a defect detected in that region.

An enterprise may see a large volume of product failures, and it is often difficult for human analysts to detect repeating design-induced patterns by viewing individual images over a long period of time. The solutions described herein enable engineers and product designers to analyze product failures at scale for the purpose of diagnosing and reducing design-related failure, for improving next generation product design, etc.

As noted above, conventional manual approaches for PFA face scaling limitations due to factors including sample acquisition and volume consistency. Sample acquisition is difficult due to the spread of products across an enterprise's global supply chain. The quantity of product failures may be variably distributed across the globe, making the sourcing of a sample set difficult to obtain. Further, locating samples within specific search criteria including but not limited to quantity, region, defect type and product type is difficult due to variables such as seasonal demand and regional variability.

Figure 5:
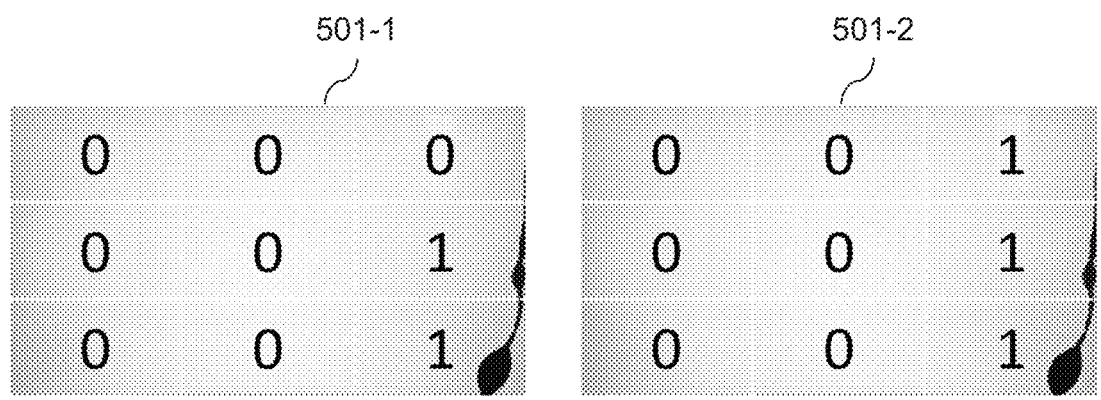
FIG. 5 shows different labeling of defects for two instances of the same input device screen image in an illustrative embodiment.

Volume consistency refers to being able to handle large volumes of product failures with consistency at scale. Conventional manual approaches for PFA are neither scalable nor consistent due to human limitations. PFA is generally performed according to written guidelines with objective criteria. Qualitative PFA, however, can be subjective in nature and may result in different outcomes depending on the person performing the analysis. This is illustrated in FIG. 5, which shows how the same standardized device image may be labeled differently (e.g., by different human analysts). The labeled device screen image 501-1 has defects marked in the M3 and B3 regions of the device screen, while the labeled device screen image 501-2 has defects marked in the T3, M3 and B3 regions of the device screen. Such labeling or other manual approaches for PFA may vary from person to person (e.g., the same image may be labeled differently by different users, as illustrated by FIG. 5), and may also vary among different repair facilities or repair centers. Such manual PFA approaches thus have limited scalability, as humans cannot realistically perform PFA on global failures due to volume constraints and labor costs. This is the primary reason why conventional PFA approaches limit evaluation to only a sample of failed products rather than the superset of all products having defects with the specified criteria.

Illustrative embodiments provide techniques for automating PFA by aggregating the visual depiction of defects across multiple samples into a single image or other representation. Some embodiments use a combination of multiple deep learning models (e.g., for image classification, semantic segmentation, etc.) followed by mathematical operations on numerical representations of images to create an easy-to-understand aggregated representation of defects for a group of products. Advantageously, the solution is low-cost, has a minimal process impact, and does not require significant hardware purchases. The method uses a set of images as input, and processes the images through multiple stages which are applied in sequential order to create a final aggregated image or other representation of device or product failure.

The preprocessing layer or stage will now be described in further detail. Assume that the set of products or devices being analyzed includes a dataset "D" containing images of laptops. The dataset D is passed to an object detection model, such as a YOLO object detection model (e.g., a YOLO v5 object detection model). YOLO ("You Only Look Once") object detection models provide a type of object detection algorithm which can quickly detect object presence. Object detection is a deep learning computer vision algorithm which detects the presence of objects within a FOV. Object detection models or algorithms, such as YOLO, are able to quickly detect object presence. The YOLO object detection model, for example, takes any image as input and outputs a value "true" if a designated object type is detected or a value of "false" if the designated object type is not detected. Here, the designated object type for the dataset D is assumed to be a device screen. In other embodiments, however, the object type may be various other portions or parts of a laptop or other devices, including but not limited to a palm rest and/or keyboard, ports, front, back or side covers, etc.

Figure 6:
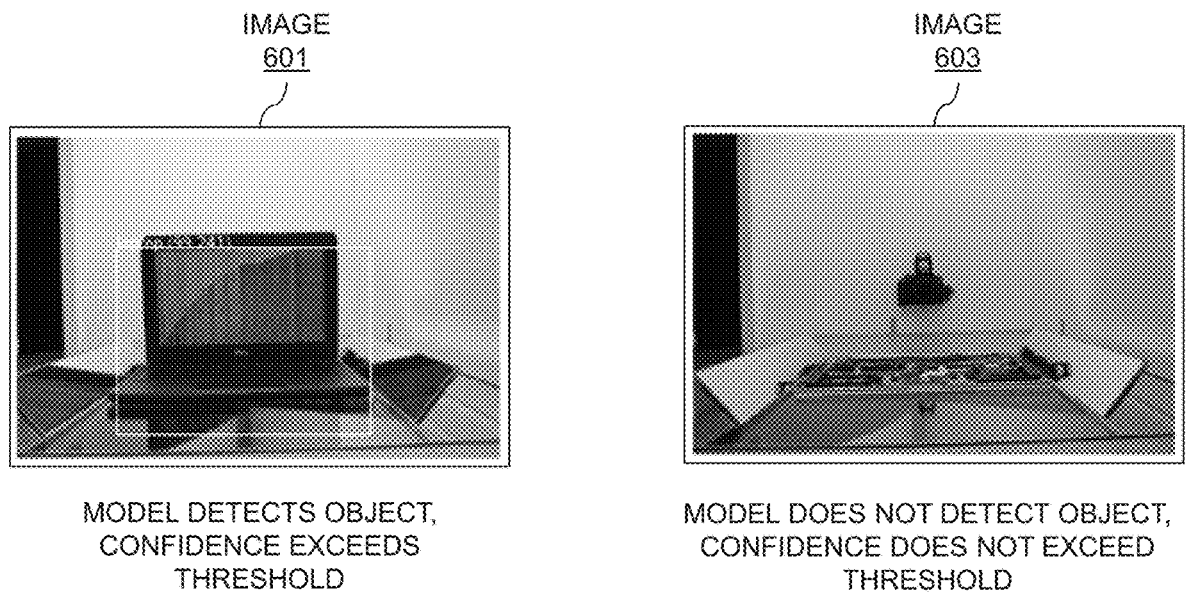
FIG. 6 shows an example application of object detection logic in an illustrative embodiment.

FIG. 6 shows an example of object presence detection logic, where a first image 601 outputs a value of "true" as a particular object type (e.g., a laptop device screen) is detected (e.g., with a confidence level exceeding some designated confidence threshold) and a second image 603 outputs a value of "false" as the particular object type is not detected (e.g., the confidence level is below the designated confidence threshold).

Figure 7:
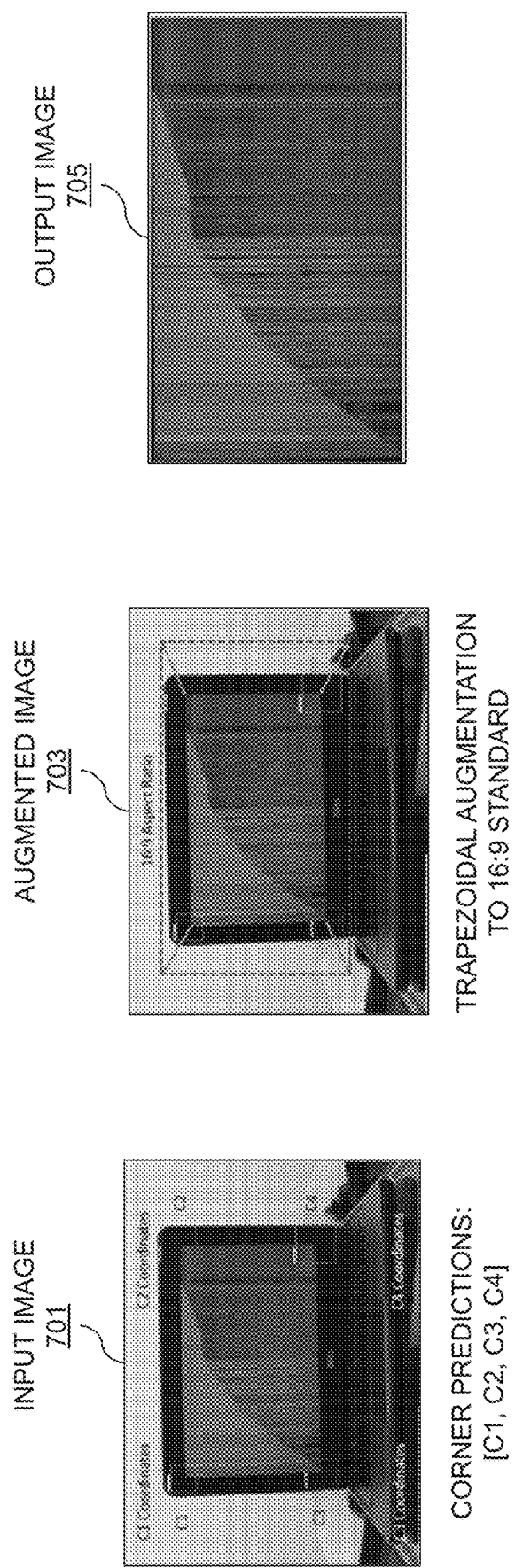
FIG. 7 shows an example application of preprocessing including corners prediction and trapezoidal augmentation in an illustrative embodiment.

All images from the dataset D for which the object type (e.g., a laptop device screen) is not detected are removed. The remaining images in the dataset D are then standardized by removing portions of images outside of the object type using an auto-cropping method. FIG. 7 illustrates application of an auto cropping method to the image 601. Corners prediction is performed on the input image 701 to locate the corners of the object. For a rectangular shaped object, for example, there are four corners and four corner classes [C1, C2, C3, C4]. The model used for corners prediction may be trained with a large number of ground truth labels (e.g., thousands of ground truth labels). Once the corners predictions are made for a particular image, the output of the object detection model may be saved (e.g., as a text file) with a normalized XYWH coordinate format. The normalized XYWH format refers to a YOLO-specific output format which prescribes the center coordinates as X and Y, with bounding box width and height as W and H. While some embodiments are described with respect to the normalized XYWH output format, various other output formats may be utilized (e.g., by changing the mathematical processing). The normalized XYWH output means that the X, Y, W and H values are divided by the size of the image, such that all values in the XYWH output fall between 0 and 1. The coordinates (e.g., of the corners) are checked and cleansed in a standardization script which looks for duplicate or missing predictions. Duplicate coordinates may be reconciled by eliminating low confidence predictions and keeping high confidence predictions. If the coordinate set does not contain at least one of each of the classes (e.g., at least one of each of the four classes [C1, C2, C3 and C4] for a rectangular shaped object), then the image is rejected. As shown in FIG. 7, the input image 701 has corner coordinates for corner classes [C1, C2, C3, C4] shown and labeled following application of the corners prediction logic.

Next, an augmented image 703 is generated through application of augmentation logic. In some embodiments, trapezoidal augmentation logic is applied (e.g., assuming that corners are detected in the input image 701). The trapezoidal augmentation uses the normalized XYWH coordinates (or other suitable coordinate output) and applies a trapezoidal augmentation to stretch the corners to a predefined resolution. The predefined resolution may be dependent on the object type. For example, an LCD object type for the screen of a laptop may be 1600×900, while a ports object type for ports on the side or rear of the laptop may be 300×3600. Various other object types (e.g., palm rest and/or keyboard, front, rear or side views of a computer case or other housing, etc.) may use different predefined resolutions. Further, the specific examples of predefined resolutions given for the LCD and ports object types are given by way of example only. Different types or models of laptops, tablets, smartphones and other computing devices with LCD or other types of display screens may utilize aspect ratios other than 16:9 (e.g., such as 16:10, 4:3, 3:2, etc.), which may be associated with different predefined resolutions.

Trapezoidal augmentation uses two input lists. The first input list is created by taking the normalized XYWH coordinate predictions, and de-normalizes the coordinates to their original size. The second input list is the predefined resolution. Consider a first input list [[89,1505],[2993,1537], [109,3233],[2985,3100]], and a second input list with the predefined 1600×900 resolution of [[0,0],[1600,0],[0,900], [1600,900]] for an LCD object type. A computer vision function, such as the Open Source Computer Vision Library (OpenCV) function called cv2.perspectiveTransform is then applied to make the transformation. The resulting output image 705 has the background removed and the object normalized to the predefined aspect resolution. Here, the output image 705 shows application of the trapezoidal augmentation logic to the augmented image 703, where the augmentation is to the 16:9 standard.

Figure 8:
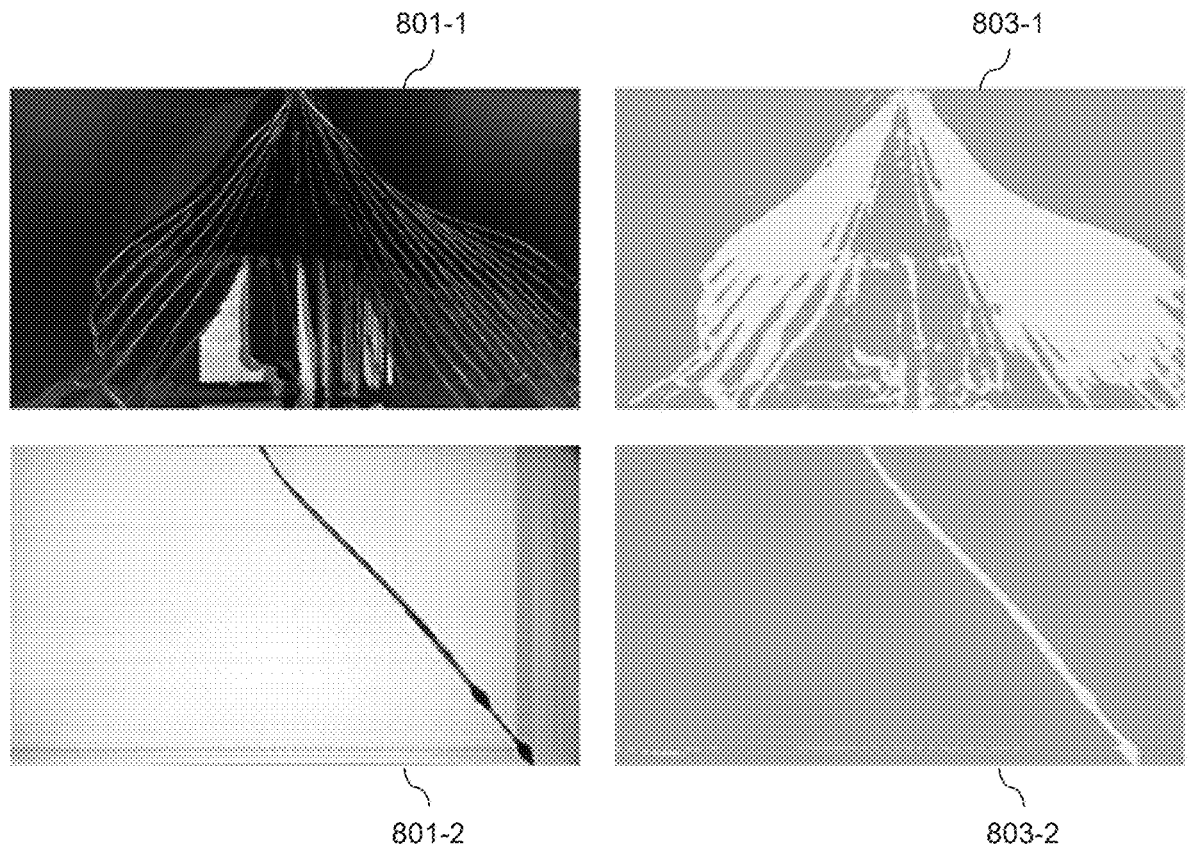
FIG. 8 shows an example of generation of masks from preprocessed device images in an illustrative embodiment.

The defect pattern generation stage is performed following the preprocessing stage. A deep learning-based image classification model is run on the dataset D to identify defective objects (e.g., with cracked LCD screens) and non-defective objects (e.g., without cracked LCD screens). The deep learning-based image classification model is trained on labeled, standardized images of defective and non-defective objects. All images with defective objects (e.g., cracked LCD screens) from the dataset D are taken, and a deep learning based semantic segmentation model is run on all the images with defective objects to generate masks. The dataset containing masks for all defective objects (e.g., cracked LCD screens) is referred to as "C." Semantic image segmentation is the task of classifying each pixel or other portion in an image as one of a predefined set of classes. Masking is an image processing method in which a small "image piece" is defined and used to modify a larger image. Masking is the process that is underneath various types of image processing techniques, including edge detection, motion detection and noise reduction. FIG. 8 illustrates application of masking to two device images 801-1 and 801-2 with cracked LCD screens to produce respective cracked screen masks 803-1 and 803-2.

The aggregation stage is performed following the defect pattern generation stage. In the aggregation stage, an aggregated representation "H" of the dataset C is produced, where the aggregated representation H represents the visual pattern of defects across the images in the dataset C. The aggregated representation H may be produced using an algorithm including mask binary digitization, binary aggregation, and visualization generation tasks. The mask binary digitization task is the process by which semantic segmentation masks are digitized into a matrix array. To perform mask binary digitization, an empty array "Result" is created to contain combined representation of all masks in the dataset C. For each image I in the dataset C containing masks, I is converted into its numerical representation. Two unique values (C1, C2) are identified, where each mask has two unique values, and where C1<C2. All values in I≤C1 are changed to 0, and all remaining values are changed to 1. Each image processed by mask binary digitization is added to Result using an addition operation. Numerical mask representations (e.g., NumPy arrays) are added to the empty Result array to get the aggregated representation H. NumPy is a Python library used for working with arrays, which has functions for working in the domain of linear algebra and matrices.

Visualization generation is then performed. An empty array denoted "Output" is created to generate the aggregated representation H for visualizing defects at a user-defined level of K*K pixels. The value of K should be a factor of both the height and width of the masks (e.g., if the masks are 1600×900, then K may be 50). For each K*K pixel section in C, the maximum value of pixels is identified, denoted Pmax. In the same K*K pixels section in Output, all the pixel values are changed to Pmax. If all pixels in C are covered, stop iteration and the Output array is saved as an image or other aggregated representation H. Example visualizations of the aggregated representation H will be described in further detail below with respect to FIGS. 10-13C.

As described above, conventional PFA methods typically involve a human analyst that selects an individual target part number, isolates the target parts within the greater population of defective incoming parts, and then imagines a matrix (e.g., a 3×3 matrix) on the target part (e.g., an LCD screen) and records the binary status of defects in the appropriate grid location. This process may be performed by multiple human analysts (e.g., at one or multiple different global locations) which may result in different results for the same input as discussed above with respect to FIG. 5.

FIG. 9 illustrates sample collection 901 for a target part number across multiple locations, which includes Sample A at Location 1, Sample B at Location 1, Sample C at Location 2, and Sample D at Location 3. FIG. 9 also illustrates operator binary evaluation 903 (e.g., of whether defects exist at each location in a 3×3 grid, the locations being denoted T1, T2, T3, M1, M2, M3, B1, B2 and B3). The matrix for Sample A at Location 1, for example, is T1=0, T2=1, T3=1, M1-0, M2-0, M3-1, B1-0, B2-0, B3-1. Table 905 includes the data from the operator binary evaluation 903 of the sample collection 901, along with the total occurrences for each location in the 3×3 grid.

Illustrative embodiments advantageously do not require isolation of a target part number, as images of each defective part, device or unit can be ingested and post-processed in an automated fashion utilizing deep learning models as described elsewhere herein. By processing a greater number (e.g., all) of defective parts, devices or units, an end user interface presentation tool is enabled which allows freedom to query various parameters from a globally collected superset of product failures without requiring isolation of target part numbers. Grouping can be done by aggregating specific part numbers via the end user interface presentation tool.

Figure 10:
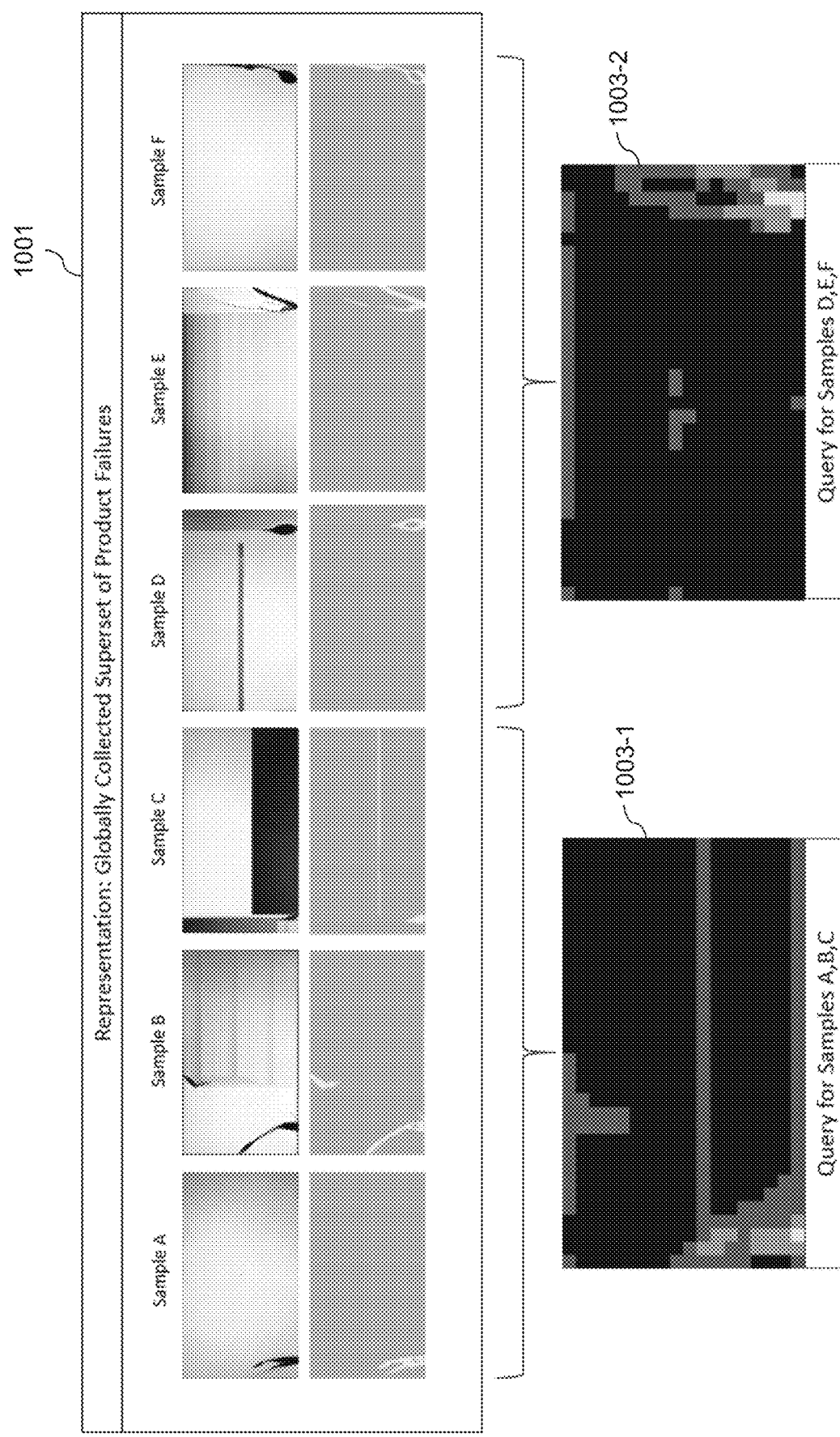
FIG. 10 shows a representation of a globally collected superset of product failure images subject to different queries for aggregated view information in an illustrative embodiment.

FIG. 10 illustrates a representation of a globally collected superset of product failures 1001, including Samples A through F which each have a preprocessed image and associated mask generated as described above. The globally collected superset of product failures 1001 may be queried as shown to produce different aggregate views 1003-1 and 1003-2. The aggregate view 1003-1 represents a query of Samples A through C (e.g., which may represent a first target part number, such as a first model of an LCD screen used in a particular laptop) and the aggregate view 1003-2 represents a query of Samples D through F (e.g., which may represent a second target part number, such as a second model of an LCD screen used in a particular laptop). In this way, comparative analysis of failure or defects across different models of the same part in a given device (e.g., different LCD screens used in different ones of a particular laptop model) is enabled which may be used to provide various insights. If the aggregate views 1003-1 and 1003-2 indicate very different defects (e.g., locations of defects), this may suggest that the defects are the result of an issue with the LCD screens themselves rather than the laptop in which they are housed. If the aggregate views 1003-1 and 1003-2 indicate the same defects (e.g., locations of defects) across different LCD screens (e.g., from different manufacturers), this may suggest that the defects are the results of some other issue (e.g., a chassis or housing of the LCD screen of the particular laptop) rather than being an issue with the LCD screens themselves. In either case, this may guide the manufacturer of the laptop in reducing failure (e.g., by selecting LCD screens from particular manufacturers which have fewer or less severe defects, by adjusting a design of other parts of the laptop to reduce LCD screen defects, etc.). Various other examples are possible.

Advantageously, the image processing functions described herein use semantic segmentation to automatically determine defect locations on an adjustable high-resolution K*K array, where the value of K is variable and user-selectable. The aggregation into a human discernible view is accomplished by combining the masks into one single image or other representation, which shows the maximum values of defects in each K*K location on this single image or other representation (e.g., a heat map).

Figure 11:
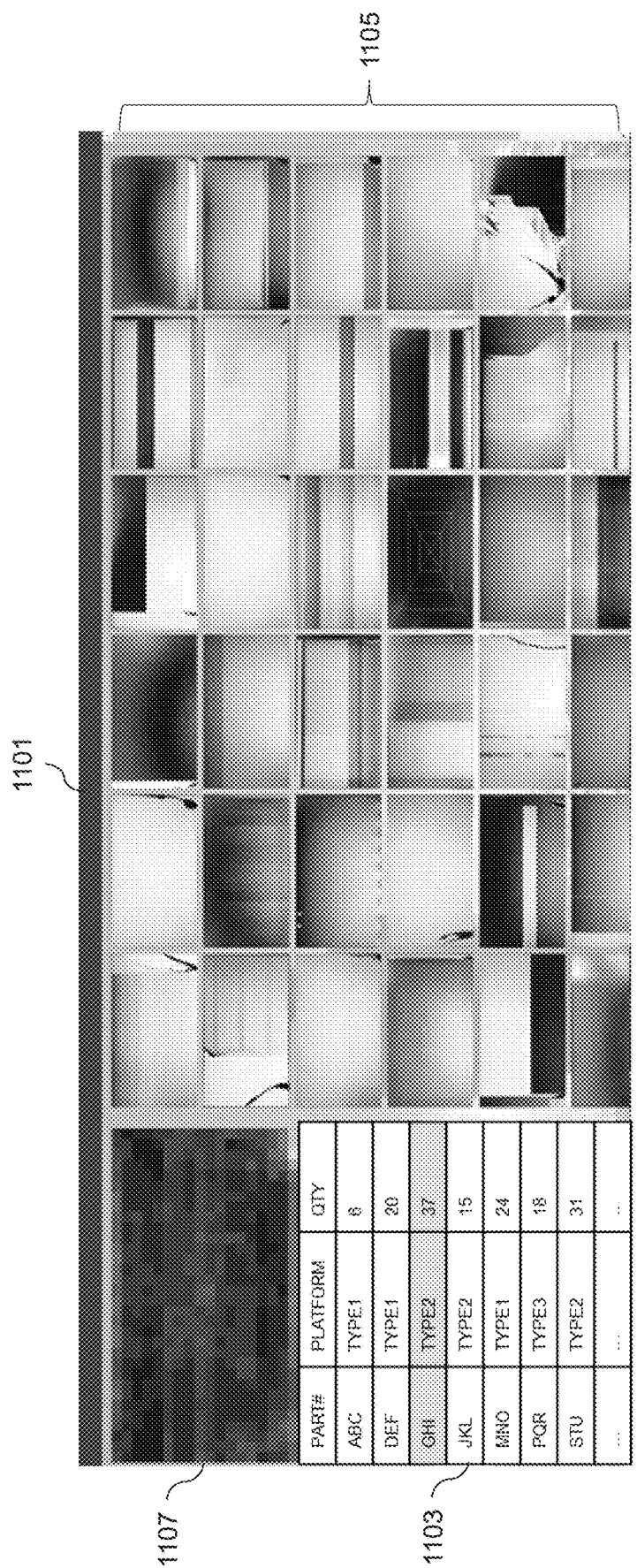
FIG. 11 shows a machine vision image library presentation tool in an illustrative embodiment.

FIG. 11 shows a machine vision image library presentation tool 1101, which includes a set of user interface selection features 1103 that enable a user to select different characteristics of products or parts thereof to analyze. In the FIG. 11 example, the user interface selection features 1103 include part number, platform and quantity. An end user of the machine vision image library presentation tool 1101 may utilize the user interface selection features 1103 to select a particular platform (e.g., a laptop model) and a particular part number (e.g., an LCD screen) for analysis. In the FIG. 11 example, platform type 2 and part number GHI is selected for analysis, which results in display 1105 of source images for that particular platform type and part number that are part of the image library, as well as display 1107 of an aggregated representation H of defects in those source images. In this example, the aggregated representation H is a heat map, though this is not a requirement. The display 1107 in FIG. 11 more particularly is generated using segmentation masks created from a set of 37 images corresponding to the part number GHI.

It should be noted that the particular user interface selection features 1103 shown in FIG. 11 are presented by way of example only, and that in other embodiments various other selection features may be used in addition to or in place of one or more of the above-described features. In some embodiments, for example, the user interface selection features 1103 may include an option for selecting a source location (e.g., a particular repair center of a set of globally-distributed repair centers), different manufacturers or providers of a particular part number (e.g., different model numbers or manufacturers that provide an LCD screen part number for use in a particular laptop), device age at time of failure, or various other characteristics of interest for performing PFA.

Figure 12:
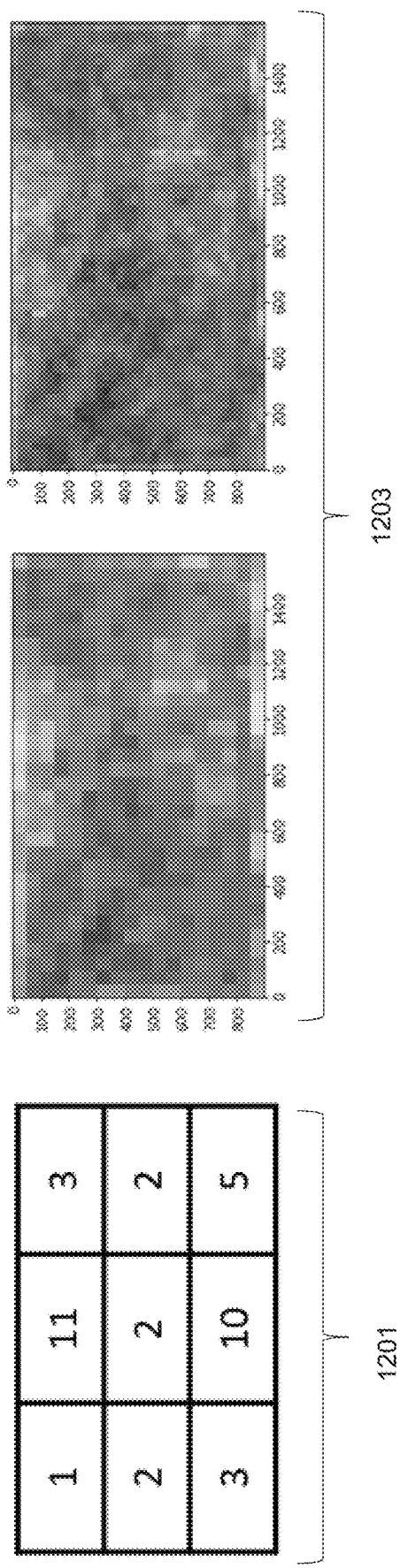
FIG. 12 shows a comparison of granularity of aggregated views of product failure images in an illustrative embodiment.

In conventional manual approaches for PFA, a low resolution grid (e.g., a 3×3 grid such as that used in FIG. 9) is typically selected to accommodate the speed of human level inspection. Such low-resolution grids, however, can inhibit analysis as it may not fully capture the characteristics of failure. Illustrative embodiments, in contrast, enable an adjustable level of granular comparison using pixel-wise algebraic operations on image masks. The comparison is not limited to a predefined grid pattern, and is scalable to any K*K resolution because of the high-resolution capabilities of the mask generation, semantic segmentation and NumPy array addition used in some embodiments. This granularity feature increases the level of detail at which a human can interpret product to product comparisons. FIG. 12 illustrates a comparison of the granularity for a conventional manual approach where a 3×3 grid 1201 is used, as well as the adjustable resolution 1203 (e.g., K*K, where K is selectable) for aggregate views enabled using the techniques described herein.

Figure 13A:
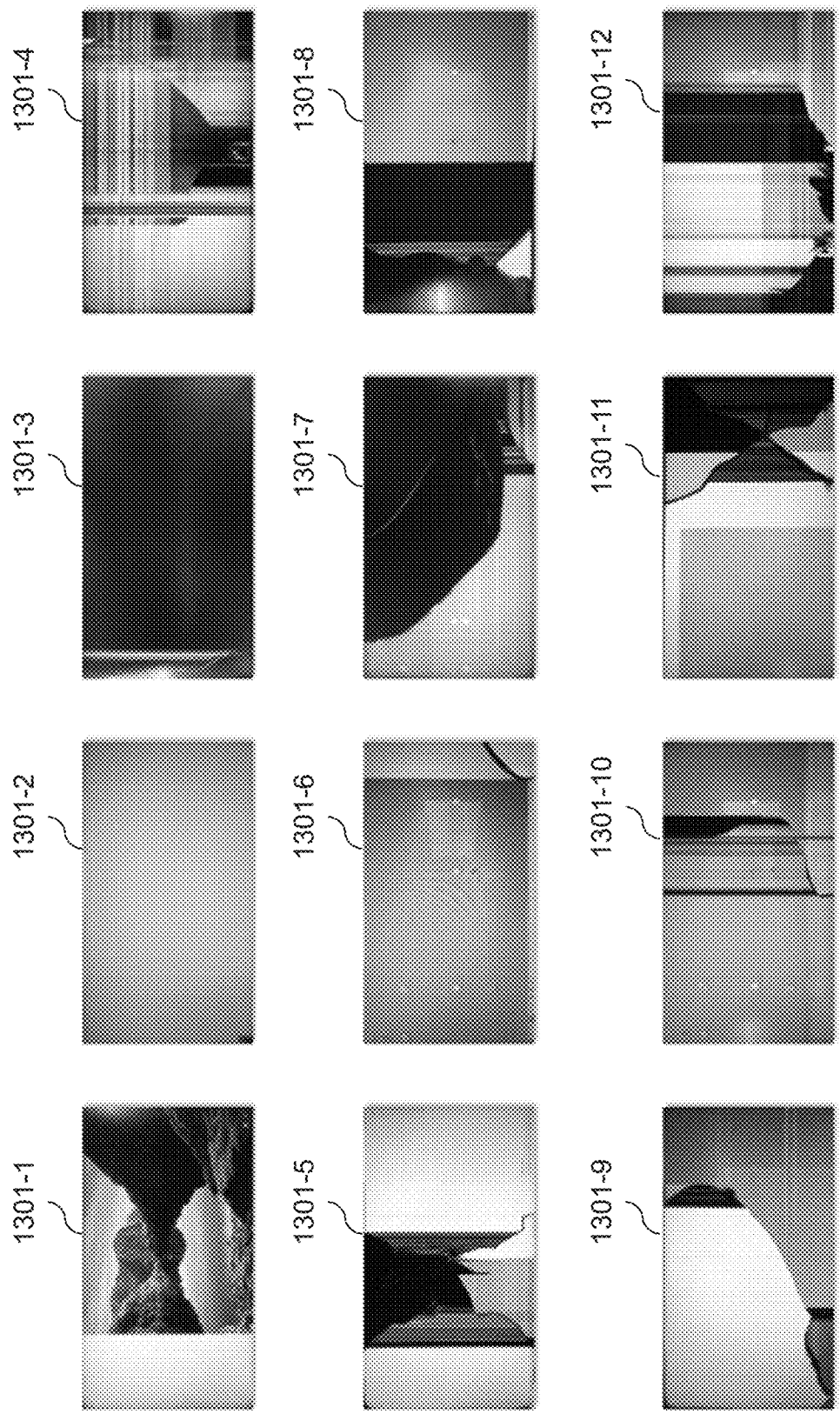
FIGS. 13A-13C show an example implementation of a three-stage approach for preprocessing, defect identification, and generation of an aggregate view of defects across a set of input images in an illustrative embodiment.
Figure 13B:
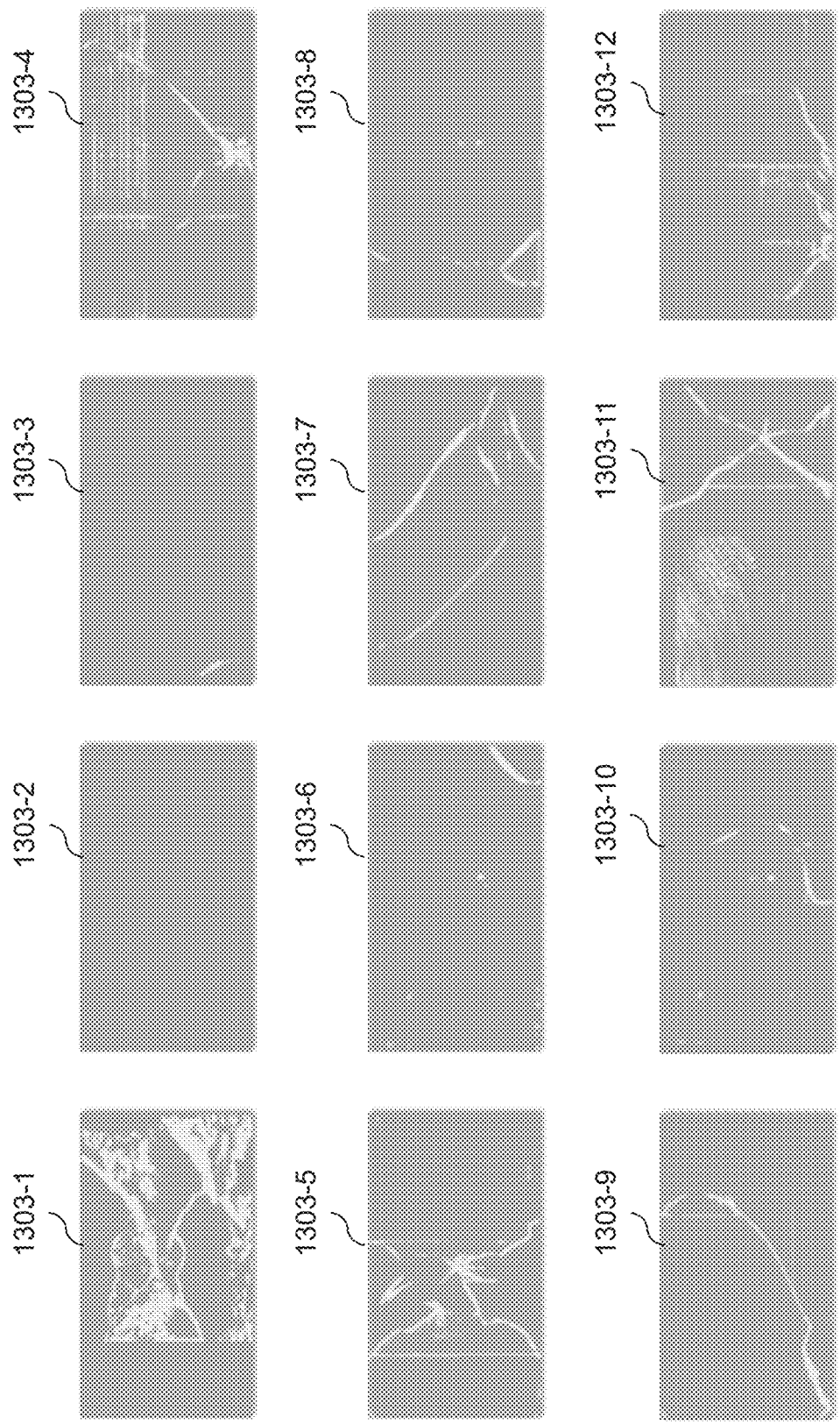
Figure 13C:
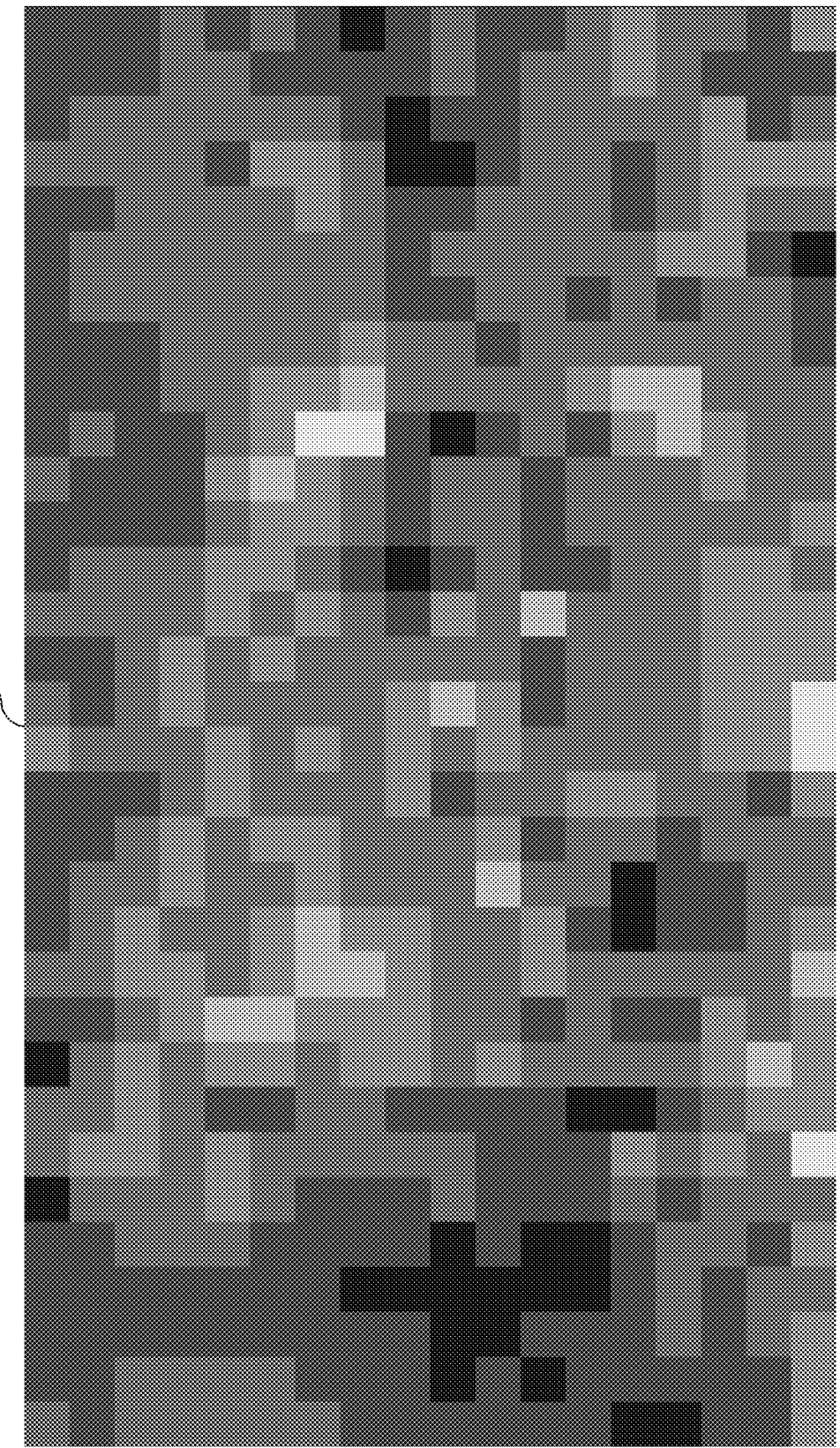

FIGS. 13A-13C show an example, where a set of input images 1301-1 through 1301-12 (collectively, input images 1301) have patterns of damage across cracked LCD screens of a given laptop model. The input images 1301 are selected after running a "cracked/not cracked" type of classification model on a larger dataset of images of the given laptop model. The input images 1301 are also shown following preprocessing as described elsewhere herein. FIG. 13B shows a set of masks 1303-1 through 1303-12 (collectively, masks 1303) generated from the input images 1301 using a semantic segmentation model. FIG. 13C shows an aggregate view 1305, representing damage patterns across the set of input images 1301 using the techniques described herein. Here, the aggregate view is a heat map where lighter shades indicate areas where damage is most frequently detected in the set of input images 1301.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for performing device failure analysis utilizing aggregated views of multiple images of devices will now be described in greater detail with reference to FIGS. 14 and 15. Although described in the context of system 100, these platforms may also be used to implement at least portions of other information processing systems in other embodiments.

Figure 14:
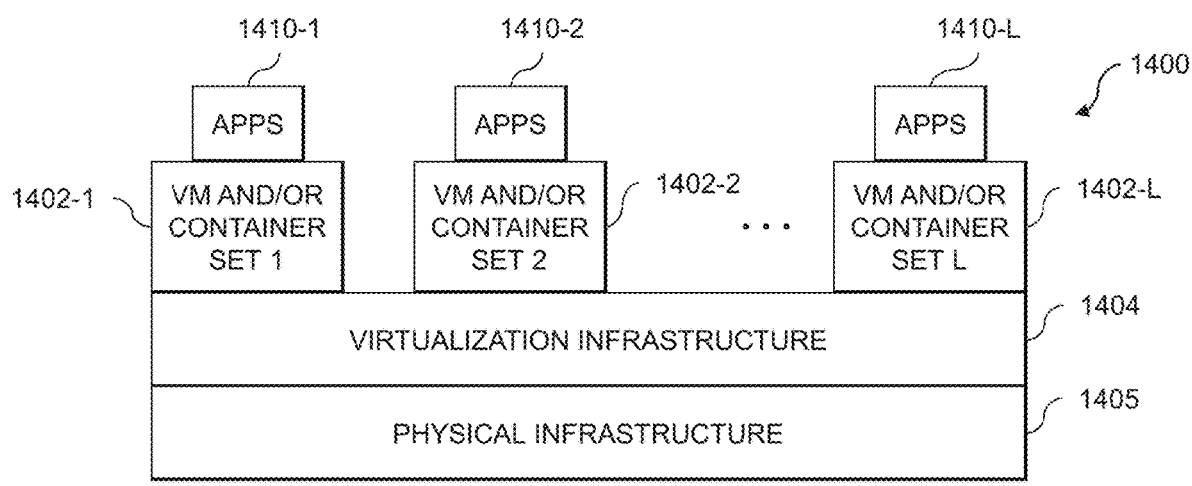
FIGS. 14 and 15 show examples of processing platforms that may be utilized to implement at least a portion of an information processing system in illustrative embodiments.
Figure 15:
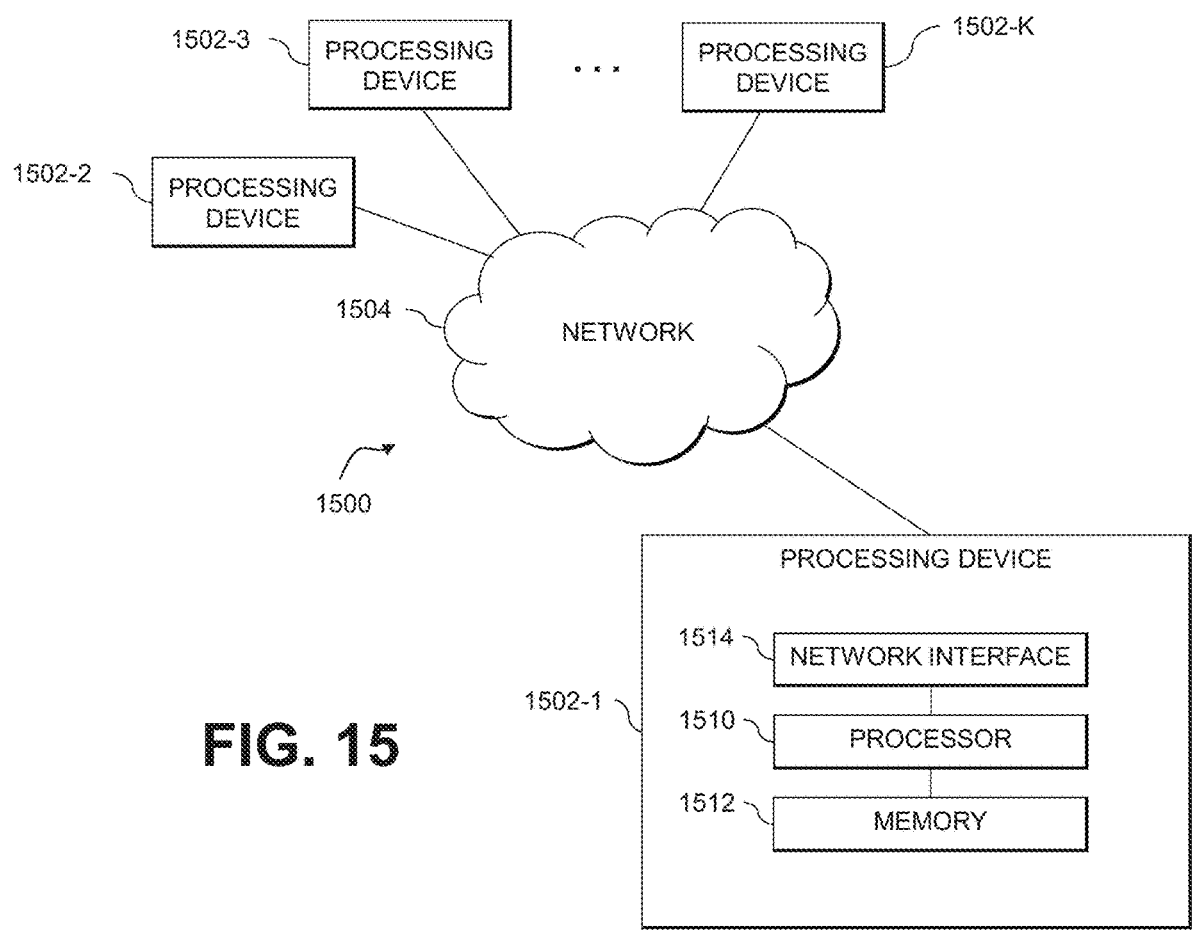

FIG. 14 shows an example processing platform comprising cloud infrastructure 1400. The cloud infrastructure 1400 comprises a combination of physical and virtual processing resources that may be utilized to implement at least a portion of the information processing system 100 in FIG. 1. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for performing device failure analysis utilizing aggregated views of multiple images of devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, images, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
obtaining a plurality of images, each of the plurality of images comprising at least a given portion of an instance of a computing device;
detecting corners of the given portion in each of the plurality of images;
generating a plurality of augmented images by performing a trapezoidal augmentation that stretches one or more of the detected corners to adjust an image resolution of the given portion in each of the plurality of images to a defined image resolution, wherein performing the trapezoidal augmentation comprises applying a computer vision-based transformation from (i) a first set of coordinate predictions for the detected corners to (ii) a second set of coordinates corresponding to the defined image resolution;
detecting, utilizing an image classification machine learning model that takes as input the plurality of augmented images, at least a subset of the plurality of augmented images having one or more designated failure characteristics;
creating, utilizing a semantic segmentation machine learning model, a mask for each augmented image in the subset of the plurality of augmented images, the created masks characterizing locations of the one or more designated failure characteristics in each augmented image in the subset of the plurality of augmented images;
generating an aggregated view of locations of the one or more designated failure characteristics for the subset of the plurality of augmented images utilizing the created masks; and
performing failure analysis for the computing device utilizing the generated aggregated view.

2. The apparatus of claim 1 wherein the at least one processing device is further configured to perform the step of preprocessing the plurality of images, wherein preprocessing a given one of the plurality of images comprises:
detecting one or more designated types of objects in the given image, at least a given one of the one or more designated types of objects comprising at least the given portion of the computing device; and
identifying features of the given portion of the computing device in the given image.

3. The apparatus of claim 2 wherein the identified features of the given portion of the computing device comprise the corners of the given portion of the computing device, and wherein identifying the features of the given portion of the computing device in the given image utilizes a corners prediction machine learning model.

4. An apparatus comprising:
at least one processing device comprising a processor coupled to a memory;
the at least one processing device being configured to perform steps of:
obtaining a plurality of images, each of the plurality of images comprising at least a given portion of an instance of a computing device;
detecting corners of the given portion in each of the plurality of images;
generating a plurality of augmented images by stretching one or more of the detected corners to adjust an image resolution of the given portion in each of the plurality of images to a defined image resolution;
detecting, utilizing an image classification machine learning model that takes as input the plurality of augmented images, at least a subset of the plurality of augmented images having one or more designated failure characteristics;
creating, utilizing a semantic segmentation machine learning model, a mask for each augmented image in the subset of the plurality of augmented images, the created masks characterizing locations of the one or more designated failure characteristics in each augmented image in the subset of the plurality of augmented images;
generating an aggregated view of locations of the one or more designated failure characteristics for the subset of the plurality of augmented images utilizing the created masks; and
performing failure analysis for the computing device utilizing the generated aggregated view;
wherein the at least one processing device is further configured to perform the step of preprocessing the plurality of images, wherein preprocessing a given one of the plurality of images comprises:
detecting one or more designated types of objects in the given image, at least a given one of the one or more designated types of objects comprising at least the given portion of the computing device; and
identifying features of the given portion of the computing device in the given image;
wherein the identified features of the given portion of the computing device comprise the corners of the given portion of the computing device, and wherein identifying the features of the given portion of the computing device in the given image utilizes a corners prediction machine learning model; and
wherein the corners prediction machine learning model utilizes object detection to make predictions for each of a set of four corner classes and outputs predictions of locations of four corners of the given portion of a given instance of the computing device, and wherein generating a given augmented image for the given image comprises utilizing an augmentation function that stretches each of the four corners of the given portion of the given instance of the computing device in the given image to a given shape with the defined image resolution.

5. An apparatus comprising:
at least one processing device comprising a processor coupled to a memory;
the at least one processing device being configured to perform steps of:
obtaining a plurality of images, each of the plurality of images comprising at least a given portion of an instance of a computing device;
detecting, utilizing an image classification machine learning model, at least a subset of the plurality of images having one or more designated failure characteristics;
creating, utilizing a semantic segmentation machine learning model, a mask for each image in the subset of the plurality of images, the created masks characterizing locations of the one or more designated failure characteristics in each image in the subset of the plurality of images;
generating an aggregated view of locations of the one or more designated failure characteristics for the subset of the plurality of images utilizing the created masks; and
performing failure analysis for the computing device utilizing the generated aggregated view;
wherein generating the aggregated view of locations of the one or more designated failure characteristics for the subset of the plurality of images utilizing the created masks comprises:
performing mask binary digitization to generate arrays with entries corresponding to different locations in a field of view of the subset of the plurality of images, wherein each entry comprises a binary value indicating whether that location has the one or more designated failure characteristics; and
performing binary aggregation of the generated arrays to determine a number of images in the subset of the plurality of images having the one or more designated failure characteristics at each of the different locations in the field of view of the subset of the plurality of images.

6. The apparatus of claim 5 wherein performing the mask binary digitization comprises, for a given one of the created masks:
converting the given mask into a numerical representation;
identifying a threshold numerical value of the numerical representation of the given mask;
changing values in the numerical representation of the given mask less than or equal to the threshold numerical value to a first binary value indicating a location having the one or more designated failure characteristics; and changing values in the numerical representation of the given mask greater than the threshold numerical value to a second binary value indicating a location not having the one or more designated failure characteristics.

7. The apparatus of claim 5 wherein generating the aggregated view of locations of the one or more designated failure characteristics for the subset of the plurality of images comprises generating a visualization of the field of view of the subset of the plurality of images, and wherein visual characteristics of different portions of the generated visualization indicate respective numbers of the images in the subset of the plurality of images having the one or more designated failure characteristics in the different locations in the field of the view of the subset of the plurality of images.

8. The apparatus of claim 7 wherein the generated visualization comprises a heat map.

9. The apparatus of claim 7 wherein generating the visualization comprises, for each K*K pixel section in the binary aggregation of the arrays, identifying a maximum value and setting all pixel values in that K*K pixel section to the identified maximum value.

10. The apparatus of claim 9 wherein K comprises a factor of both a pixel height and a pixel width of the created masks.

11. The apparatus of claim 1 wherein the given portion of the computing device comprises a screen of the computing device.

12. The apparatus of claim 1 wherein the given portion of the computing device comprises a set of ports of the computing device.

13. The apparatus of claim 1 wherein performing failure analysis for the computing device utilizing the generated aggregated view comprises determining differences in locations of the one or more designated failure characteristics for two or more different sets of instances of the computing device.

14. The apparatus of claim 13 wherein the two or more different sets of instances of the computing device utilize different part models in the given portion of the computing device.

15. A computer program product comprising a non-transitory processor-readable storage medium having stored therein program code of one or more software programs, wherein the program code when executed by at least one processing device causes the at least one processing device to perform steps of:

obtaining a plurality of images, each of the plurality of images comprising at least a given portion of an instance of a computing device;

detecting corners of the given portion in each of the plurality of images;

generating a plurality of augmented images by performing a trapezoidal augmentation that stretches one or more of the detected corners to adjust an image resolution of the given portion in each of the plurality of images to a defined image resolution;

detecting, utilizing an image classification machine learning model that takes as input the plurality of augmented images, at least a subset of the plurality of augmented images having one or more designated failure characteristics;

creating, utilizing a semantic segmentation machine learning model, a mask for each augmented image in the subset of the plurality of augmented images, the created masks characterizing locations of the one or more designated failure characteristics in each augmented image in the subset of the plurality of augmented images;

generating an aggregated view of locations of the one or more designated failure characteristics for the subset of the plurality of augmented images utilizing the created masks; and performing failure analysis for the computing device utilizing the generated aggregated view;

wherein generating the aggregated view of locations of the one or more designated failure characteristics for the subset of the plurality of augmented images utilizing the created masks comprises:

performing mask binary digitization to generate arrays with entries corresponding to different locations in a field of view of the subset of the plurality of augmented images, wherein each entry comprises a binary value indicating whether that location has the one or more designated failure characteristics; and performing binary aggregation of the generated arrays to determine a number of augmented images in the subset of the plurality of augmented images having the one or more designated failure characteristics at each of the different locations in the field of view of the subset of the plurality of augmented images.

16. The computer program product of claim 15 wherein performing failure analysis for the computing device utilizing the generated aggregated view comprises determining differences in locations of the one or more designated failure characteristics for two or more different sets of instances of the computing device, and wherein the two or more different sets of instances of the computing device utilize different part models in the given portion of the computing device.

17. A method comprising steps of:

obtaining a plurality of images, each of the plurality of images comprising at least a given portion of an instance of a computing device;

detecting corners of the given portion in each of the plurality of images;

generating a plurality of augmented images by performing a trapezoidal augmentation that stretches one or more of the detected corners to adjust an image resolution of the given portion in each of the plurality of images to a defined image resolution;

detecting, utilizing an image classification machine learning model that takes as input the plurality of augmented images, at least a subset of the plurality of augmented images having one or more designated failure characteristics;

creating, utilizing a semantic segmentation machine learning model, a mask for each augmented image in the subset of the plurality of augmented images, the created masks characterizing locations of the one or more designated failure characteristics in each augmented image in the subset of the plurality of augmented images;

generating an aggregated view of locations of the one or more designated failure characteristics for the subset of the plurality of augmented images utilizing the created masks; and performing failure analysis for the computing device utilizing the generated aggregated view;

wherein generating the aggregated view of locations of the one or more designated failure characteristics for the subset of the plurality of augmented images utilizing the created masks comprises:

performing mask binary digitization to generate arrays with entries corresponding to different locations in a field of view of the subset of the plurality of augmented images, wherein each entry comprises a binary value indicating whether that location has the one or more designated failure characteristics; and performing binary aggregation of the generated arrays to determine a number of augmented images in the subset of the plurality of augmented images having the one or more designated failure characteristics at each of the different locations in the field of view of the subset of the plurality of augmented images; and wherein the method is performed by at least one processing device comprising a processor coupled to a memory.

18. The method of claim 17 wherein performing failure analysis for the computing device utilizing the generated aggregated view comprises determining differences in locations of the one or more designated failure characteristics for two or more different sets of instances of the computing device, and wherein the two or more different sets of instances of the computing device utilize different part models in the given portion of the computing device.

19. The method of claim 17 wherein performing the mask binary digitization comprises, for a given one of the created masks:

converting the given mask into a numerical representation;

identifying a threshold numerical value of the numerical representation of the given mask;

changing values in the numerical representation of the given mask less than or equal to the threshold numerical value to a first binary value indicating a location having the one or more designated failure characteristics; and changing values in the numerical representation of the given mask greater than the threshold numerical value to a second binary value indicating a location not having the one or more designated failure characteristics.

20. The method of claim 17 wherein generating the aggregated view of locations of the one or more designated failure characteristics for the subset of the plurality of images comprises generating a visualization of the field of view of the subset of the plurality of images, and wherein visual characteristics of different portions of the generated visualization indicate respective numbers of the images in the subset of the plurality of images having the one or more designated failure characteristics in the different locations in the field of the view of the subset of the plurality of images.

* * * * *